(12) United States Patent
Chapman et al.

(10) Patent No.: US 8,588,528 B2
(45) Date of Patent: Nov. 19, 2013

(54) SYSTEMS AND METHODS FOR DISPLAYING SCANNED IMAGES WITH OVERLAID TEXT

(75) Inventors: Peter Chapman, Bedford, MA (US); Paul Albrecht, Bedford, MA (US)

(73) Assignee: K-NFB Reading Technology, Inc., Wellesley Hills, MA (US)

( * ) Notice: Subject to any disclaimer, the term of this patent is extended or adjusted under 35 U.S.C. 154(b) by 243 days.

(21) Appl. No.: 12/820,620

(22) Filed: Jun. 22, 2010

(65) Prior Publication Data

US 2010/0329555 A1 Dec. 30, 2010

Related U.S. Application Data

(60) Provisional application No. 61/219,448, filed on Jun. 23, 2009.

(51) Int. Cl.
*G06K 9/18* (2006.01)

(52) U.S. Cl.
USPC ........... 382/182; 382/218; 382/294; 382/167; 707/708; 704/231; 704/251; 704/260

(58) Field of Classification Search
CPC ............. G06K 2209/01; G06K 9/344; G06K 9/00442; G06K 9/00483; G06K 9/6828
USPC .................. 382/182, 218, 294, 167; 707/708; 704/231, 251, 260
See application file for complete search history.

(56) References Cited

U.S. PATENT DOCUMENTS

| | | | |
|---|---|---|---|
| 6,415,307 B2 | 7/2002 | Jones et al. | |
| 6,587,583 B1 * | 7/2003 | Kurzweil et al. | 382/164 |
| 7,450,268 B2 | 11/2008 | Martinez et al. | |
| 7,453,472 B2 | 11/2008 | Goede et al. | |
| 7,593,138 B2 | 9/2009 | Barnes | |
| 7,667,863 B1 | 2/2010 | Eldred et al. | |
| 7,765,477 B1 | 7/2010 | Dash | |
| 7,787,712 B2 | 8/2010 | Takahashi et al. | |
| 8,014,560 B2 | 9/2011 | Nafarieh et al. | |
| 8,028,231 B2 | 9/2011 | Jeffery et al. | |
| 8,045,204 B2 | 10/2011 | Henry et al. | |
| 2003/0217360 A1 * | 11/2003 | Gordon et al. | 725/54 |
| 2006/0136629 A1 * | 6/2006 | King et al. | 710/72 |
| 2008/0304113 A1 | 12/2008 | Curry et al. | |
| 2009/0109479 A1 | 4/2009 | Kato | |
| 2010/0007915 A1 | 1/2010 | Ogino et al. | |
| 2010/0172590 A1 * | 7/2010 | Foehr et al. | 382/217 |
| 2011/0010645 A1 | 1/2011 | Mihalcea | |
| 2011/0035289 A1 | 2/2011 | King et al. | |

\* cited by examiner

*Primary Examiner* — Mike Rahmjoo
(74) *Attorney, Agent, or Firm* — Fish & Richardson P.C.

(57) ABSTRACT

Disclosed are techniques and systems to provide a scanned image in which a portion of the image is overlaid with OCR generated text corresponding to the text of the original scanned document.

21 Claims, 7 Drawing Sheets

SYSTEMS AND METHODS FOR DISPLAYING SCANNED IMAGES WITH OVERLAID TEXT

This application claims priority from and incorporates herein by reference in its entirety U.S. Provisional Application No. 61/219,448, filed Jun. 23, 2009, and titled "SYSTEMS AND METHODS FOR DISPLAYING SCANNED IMAGES WITH OVERLAID TEXT."

BACKGROUND

Optical character recognition (OCR) refers to mechanical or electronic translation of images such as scanned images of handwritten, typewritten or printed text into machine-encoded text. OCR is sometimes used to convert documents into electronic files. OCR can enable editing of the text, searching for a word or phrase, and/or applying other techniques such as machine translation, text-to-speech and text mining to the text.

SUMMARY

This invention relates generally to educational and entertainment tools and more particularly to techniques and systems which are used to display a scanned image in which a portion of the scanned image is overlaid with text.

In some aspects, a computer-implemented method includes receiving, by one or more computers, an image file that includes a scanned image of a document. The method also includes performing, by the one or more computers, optical character recognition (OCR) on the image file to generate a text file that includes text associated with words included in the image file. The method also includes displaying the document on a display of a computing device with portions of the document having recognized text being overlaid with optical character recognized text.

Embodiments can include one or more of the following.

Generating the display can include overlaying text-based portions to obscure the scanned image of the document. The method can also include determining a location of a word in the scanned image and aligning the word with the determined location in the scanned image in the display of the document. The method can also include determining a color of a word in the scanned image and formatting the OCR text of the word to match the determined color of the word. The method can also include determining a font style of a word in the scanned image and formatting the OCR text of the word to match the determined font style of the word. The method can also include determining a color of a background surrounding a word in the scanned image and formatting the OCR text of the word to include a background color to match the determined or of the background surrounding the word. The method can also include determining a color of a word in the scanned image, formatting the OCR text of the word to match the determined color of the word, determining a font style of a word in the scanned image, formatting the OCR text of the word to match the determined font style of the word, determining a color of a background surrounding a word in the scanned image, and formatting the OCR text of the word to include a background color to match the determined color of the background surrounding the word. The method can also include identifying the text-based portions of the scanned image associated with text on the document and identifying the image-based portions of the scanned image associated with images on the document.

In some aspects, a computer program product tangibly embodied in a computer readable medium can include instructions to cause a processor to receive an image file that includes a scanned image of a document, perform optical character recognition (OCR) on the image file to generate a text file that includes text associated with words included in the image file, and display the document on a display of a computing device with portions of the document having recognized text being overlaid with optical character recognized text.

Embodiments can include one or more of the following.

The instructions to display the document can include instructions to overlay text-based portions to obscure the scanned image of the document. The computer program product can further include instructions to determine a location of a word in the scanned image and align the word with the determined location in the scanned image in the display of the document. The computer program product can further include instructions to determine a color of a word in the scanned image and format the OCR text of the word to match the determined color of the word. The computer program product can further include instructions to determine a font style of a word in the scanned image and format the OCR text of the word to match the determined font style of the word. The computer program product can further include instructions to determine a color of a background surrounding a word in the scanned image and format the OCR text of the word to include a background color to match the determined color of the background surrounding the word. The computer program product can further include instructions to determine a color of a word in the scanned image, format the OCR text of the word to match the determined color of the word, determine a font style of a word in the scanned image, format the OCR text of the word to match the determined font style of the word, determine a color of a background surrounding a word in the scanned image, and format the OCR text of the word to include a background color to match the determined color of the background surrounding the word. The computer program product can further include instructions to identify the text-based portions of the scanned image associated with text on the document and identify the image-based portions of the scanned image associated with images on the document.

In some aspects, a system includes an optical character recognition module configured to perform optical character recognition (OCR) on the image file to generate a text file that includes text associated with words included in the image file. The system also includes a display module configured to display the document on a display of a computing device with portions of the document having recognized text being overlaid with optical character recognized text.

Embodiments can include one or more of the following.

The display module can be further configured to overlay text-based portions to obscure the scanned image of the document. The OCR module can be further configured to determine a location of a word in the scanned image and the display module can be further configured to align the word with the determined location in the scanned image in the display of the document. The OCR module can be further configured to determine a color of a word in the scanned image and the display module can be further configured to format the OCR text of the word to match the determined color of the word. The OCR module can be further configured to determine a font style of a word in the scanned image and the display module can be further configured to format the OCR text of the word to match the determined font style of the word. The OCR module can be further configured to determine a color of a background surrounding a word in the scanned image and the display module can be further configured to format the OCR text of the word to include a background color to match the determined color of the background surrounding the word. The OCR module can be further configured to determine a color of a word in the scanned image and the display module can be further configured to format the OCR text of the word to match the determined color of the word. The OCR module can be further configured to determine a font style of a word in the scanned image and the display module can be further configured to format the OCR text of the word to match the determined font style of the word. The OCR module can be further configured to determine a color of a background surrounding a word in the scanned image and the display module can be further configured to format the OCR text of the word to include a background color to match the determined color of the background surrounding the word. The OCR module can be further configured to identify the text-based portions of the scanned image associated with text on the document and the OCR module can be further configured to identify the image-based portions of the scanned image associated with images on the document.

DETAILED DESCRIPTION

Figure 1:
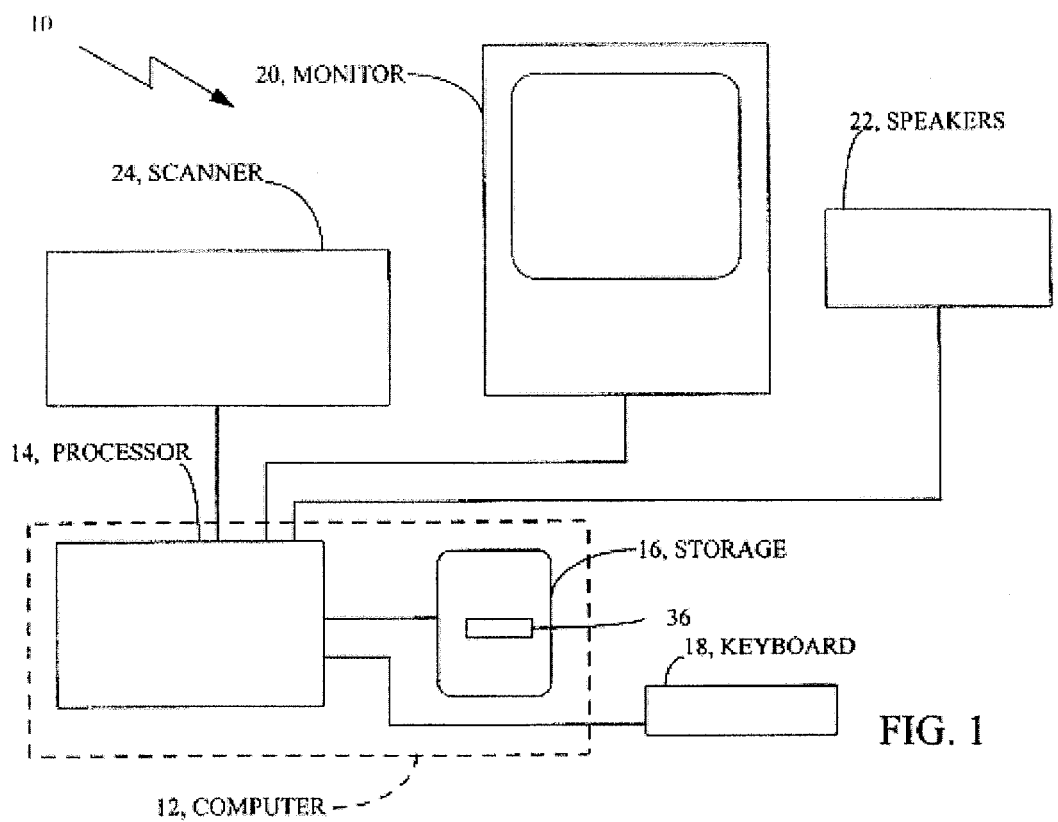
FIG. 1 is a block diagram of a system.

Referring now to FIG. 1, a reading machine 10 is shown to include a computer system 12. The computer 12 is generally a personal computer or can alternatively be another type of computing device (e.g., a cellular phone that includes a processor, an ipod, a handheld computer, a camera, an electronic book reader, etc.) and typically includes a central processor unit (not shown) that is part of a processor 14. In some examples, the processor 14 can be a Pentium based system from Intel Corporation, Santa Clara, Calif., although other processors could alternatively be used. In addition to the CPU, the processor includes main memory, cache memory and bus interface circuits (not shown). The computer system 12 includes a mass storage element 16, here typically the hard drive associated with personal computer systems.

The reading system 10 further includes a standard PC type keyboard 18, a standard monitor 20 as well as speakers 22, a sound card (not shown), a pointing device such as a mouse 19 and a scanner 24 all coupled to various ports of the computer system 10 via appropriate interfaces and software drivers (not shown). The computer system 12 here operates under a Windows Microsoft Corporation operating system although other systems could alternatively be used.

Resident on the mass storage element 16 is image display and conversion software 30 (FIG. 2) that controls the display of a scanned image provided from scanner 24. In addition, the software 30 permits the user to control various features of the reader by referencing the image representation of the document displayed by the monitor.

Figure 2:
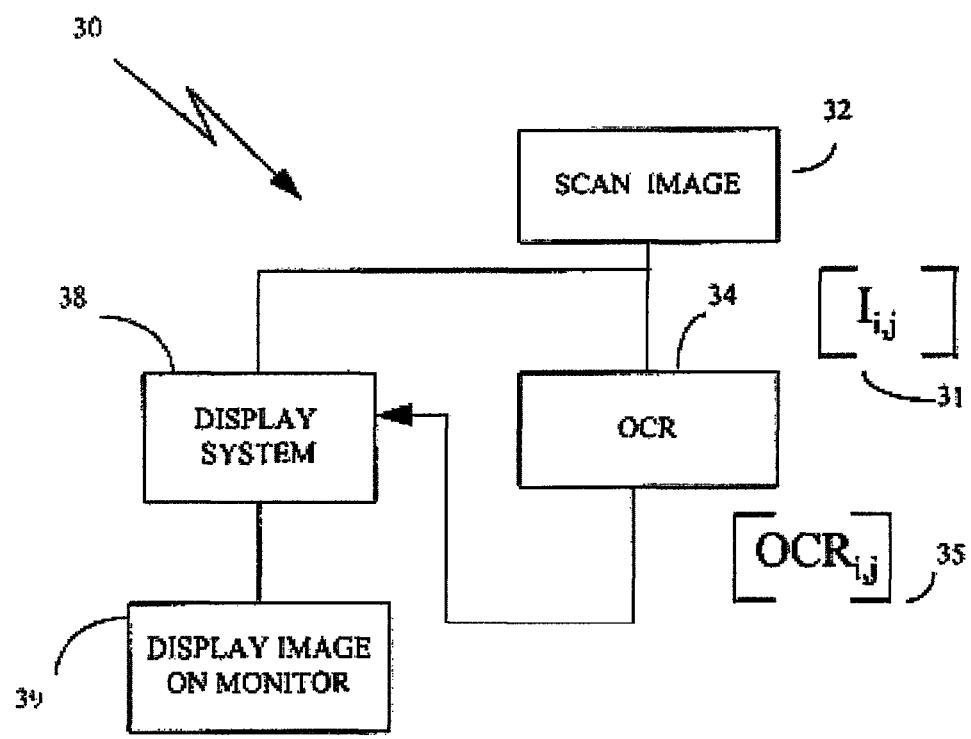
FIG. 2 is a flowchart of recognizing text on a scanned image.

Referring now to FIG. 2, the steps used in the image display and conversion software 30 include scanning an input document to provide an image file (step 32). In general the input document is scanned in a conventional manner or obtained by taking a digital image of a document using a digital camera and produces an image file 31 which is fed to an optical character recognition (OCR) module 34. The OCR module 34 uses conventional optical character recognition techniques on the data provided from the scanned image 32 to produce an output data structure 35. Alternatively, image-like representations can be used as a source such as a stored bitmapped version of a document.

The array of OCR data structures generally denoted as 35 produced by step 34 includes information corresponding to textual information or the OCR converted text, as well as, positional and size information associated with the particular text element. The positional and size information associates the text element to its location in the image representation of the document as displayed on the monitor 20. The data structure can also include information related to formatting such as font style, font color, background color, font size, and so forth. More particularly, the data structure includes for a particular word an OCR text representation of the word stored in a field. The data structure also has positional information including X-axis coordinate information stored in a field, Y-axis coordinate information stored in a field, height information stored in a field, width information stored in a field, and formatting information stored in one or more fields. The positional information defines the bounds of an imaginary rectangle enclosing an area associated with the corresponding word. That is, when the text-based portion of the scanned image is replaced by an OCR recognition of the text, then the coordinates within the area of this rectangle are the coordinates replaced with the OCR text.

The image file 31 and the OCR recognized text are also fed to a display system 38 which processes the image file and the OCR text to permit it to be displayed on the monitor at step 39. More particularly, the display system displays the image file in portions of the scanned document that are not text-based (e.g., portions associated with figures, photographs, charts, and other non-textual information) and displays the OCR recognized text in the text based portions of the document. As such, in the text-based portions of the scanned document, the original scanned image is overlaid with the OCR text such that the user views the OCR generated text and not the originally scanned image. By replacing the scanned image of the text with the OCR-generated text, the quality of the text-based portion presented to the user can be improved.

In order to overlay the original scanned image with the OCR text, the system includes software that identifies text in the original scanned image. The system also identifies the font type (e.g., Arial, Times New Roman, Courier, etc.) and the font size. The system then overlays the text on the original scanned image with text of the same (or similar) font and font size as what was used in the original image. Since this overlaid text has not been scanned, the quality of the text is enhanced in comparison to the scanned image. In some additional embodiments, the system can replace a font that is more difficult to read (e.g., a script based font) with a font that is easier to read such as Times New Roman or Courier.

Both the image file 31 and the text file 35 are stored in the reading system for use during the session and can be permanently stored for latter use.

Figure 3:
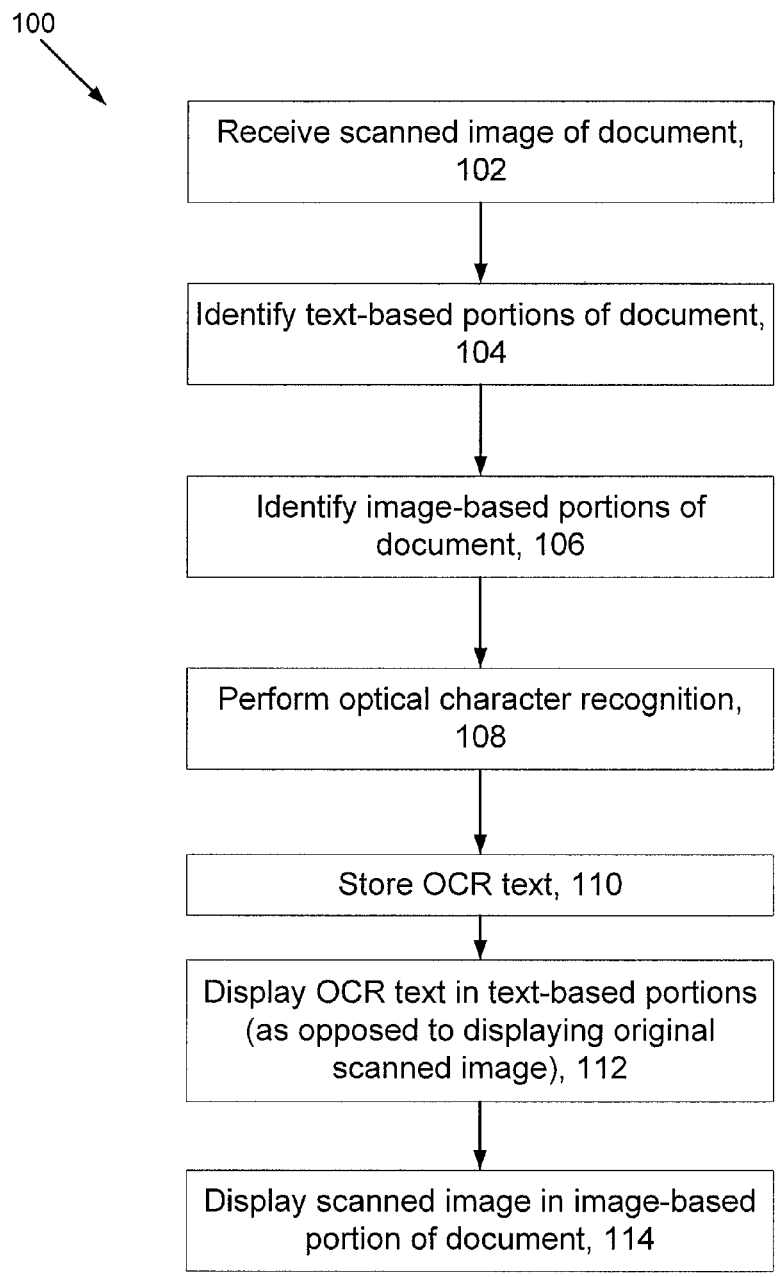
FIG. 3 is a flow chart of a process for displaying a scanned image with a portion overlaid with text.

FIG. 3 shows a process 100 for generating a display in which text-based portions of an originally scanned document are replaced or overlaid with OCR generated text and the original scanned document is only displayed in non-text based portions of the document, as discussed below. The system receives 102 a scanned image of a document. The image can include text-based portions and non-text-based portions. The text-based portions include words (e.g., single words, sentences, paragraphs) or numbers which can be recognized by an OCR process. The non-text-based portions include drawings, pictures, figures, charts, graphs, and the like. The system identifies 104 text-based portions of the image of the scanned document and identifies 106 non-text-based portions of the image of the scanned document. The system performs 108 optical character recognition (OCR) on the text-based portions of the image of the scanned document and stores 110 the OCR generated text. Words in the OCR generated text are associated with a location identifier to match the location of the OCR generated text with the location of the text in the image of the scanned document. In some examples this is stored in the same data structures that store the OCR converted text. Other arrangements are possible. In producing a display of the scanned document, system displays 112 the OCR text in the text-based portions of the image of the scanned document (as opposed to displaying the text from the original scanned image) and displays 114 the scanned image in the image-based (e.g., the non-text-based) portions of the document.

Figure 4A:
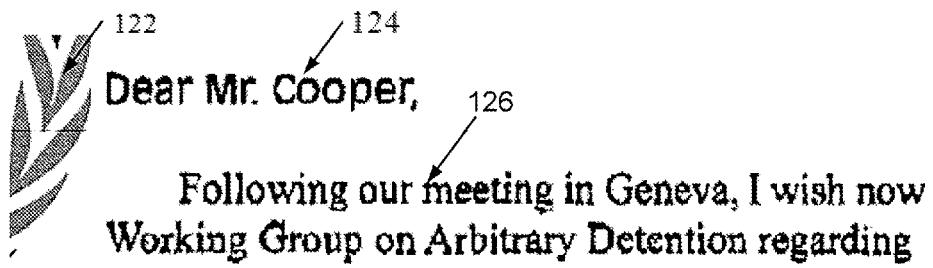
FIG. 4A is an exemplary scanned image.

FIG. 4A shows an exemplary image of a scanned document. As can be seen the image includes portions (e.g., portions 124 and 125) that are text-based portions and a portion (e.g., portion 122) that is non-text based. In the scanned image of the document, the text in the text-based portions 124 and 126 may be somewhat fuzzy or non-crisp due to the scanning process. When the user tries to read the text included in the scanned image, the low quality of the text can make reading the scanned text difficult.

Figure 4B:
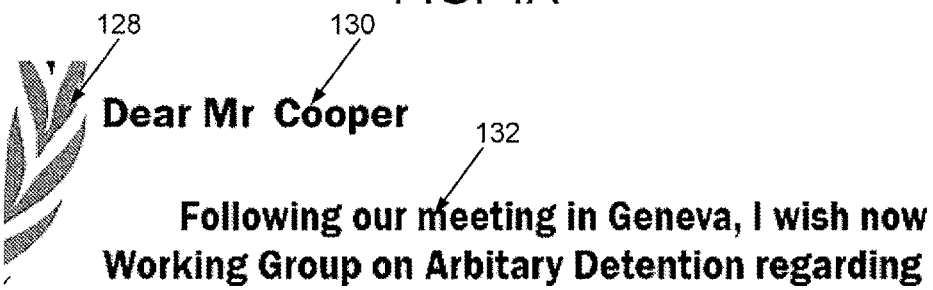
FIG. 4B is the exemplary scanned image of FIG. 4A with the scanned text overlaid or replaced by text generated by optical character recognition.

FIG. 4B shows the scanned document of FIG. 4A after the text-based portions 124 and 126 have been overlaid with OCR generated text. As can be seen, the clarity of the text based portions is improved by replacing the scanned text with text generated by the OCR process 130, 132. The OCR generated text is formatted to match the original text.

Figure 5:
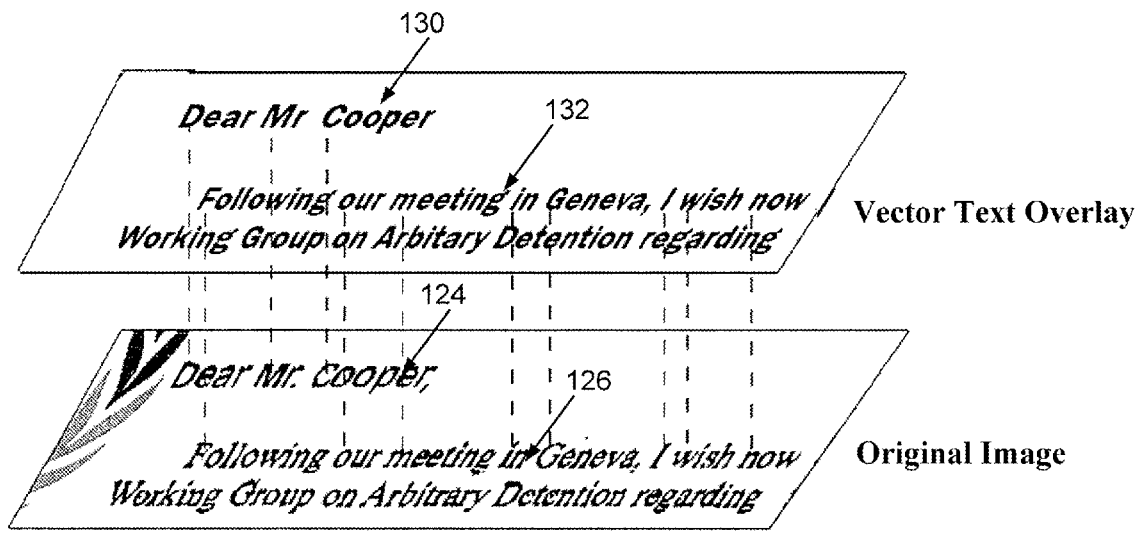
FIG. 5 is an exemplary alignment of the scanned image and the text generated by the optical character recognition.

FIG. 5 shows the alignment of the OCR generated text when the OCR text 130, 132 is overlaid onto the original scanned document to replace the originally scanned text 124, 126 in the image presented to the user. Each word of the text is sized and aligned to match the sizing and alignment of the OCR generated text in the original scanned image. The text only overlays text based portions of the scanned image of the original document. As such, the image from the original scanned document is still shown after the text has been overlaid.

In some embodiments, when the OCR text is overlaid onto the original scanned image, it can be beneficial to match the font, size, color, or other aesthetic characteristics of the OCR text to the aesthetic characteristics of the original scanned image. By matching the aesthetic characteristics, the overall look and feel of the document remains the same (or similar) after the text-based portions of the original scanned image of the document have been replaced by the OCR generated text.

Figure 6:
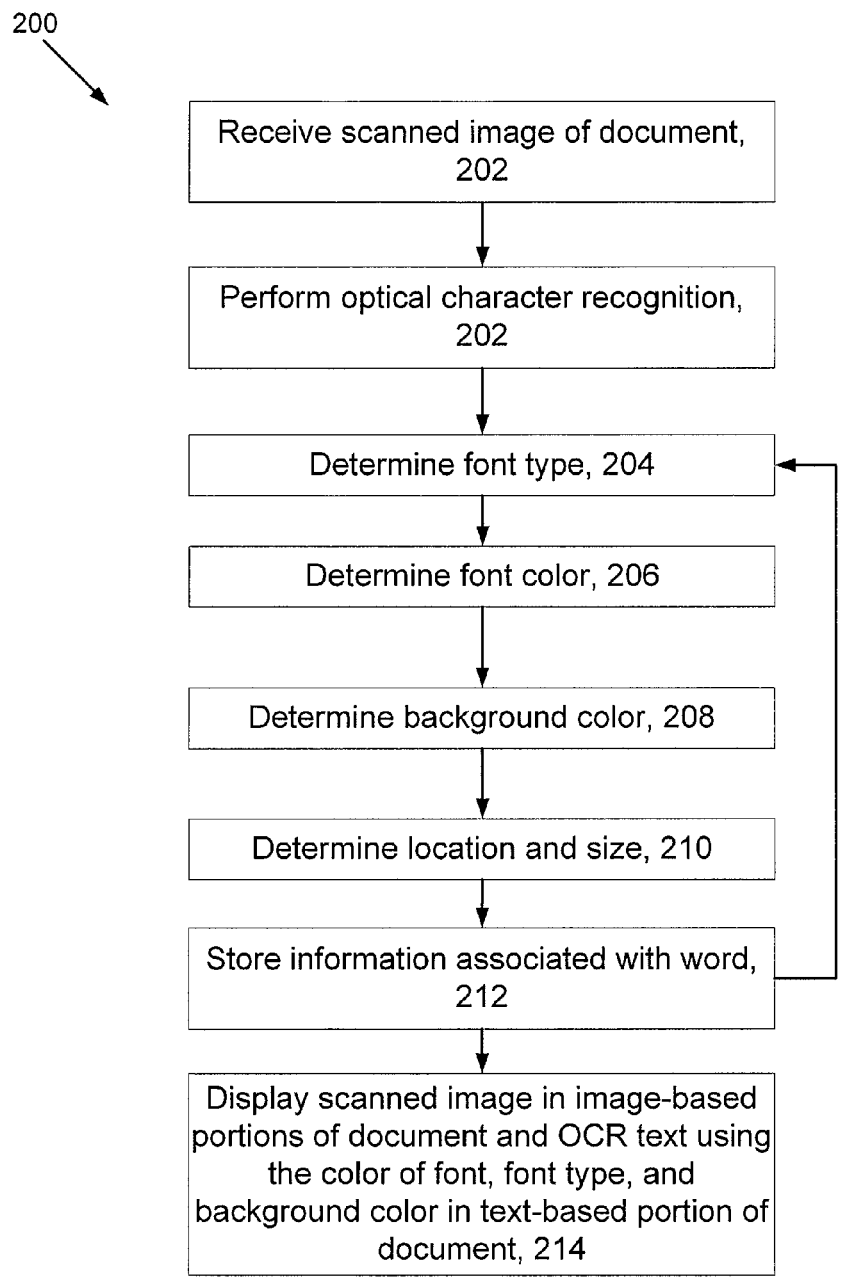
FIG. 6 is a flow chart of a process for replacing scanned text with text generated based on optical character recognition.

FIG. 6 shows a process 200 for matching aesthetic characteristics of the OCR generated text to those of a scanned image such that the OCR generated text matches the underlying image when overlaid onto the scanned image. The system receives 202 a scanned image of a document and performs 203 optical character recognition on the scanned document to identify and recognize the words included in the text-based portions of the document. For a particular recognized word, the system determines 204 the font type, determines 206 the font color, determines 208 the background color, and determines 210 the size and location of the word on the document. The font color corresponds to the color of the letters of the text recognized by the system. If an exact match is not identified for the font color, a color similar to the color of the original font can be selected. Similarly, the background color corresponds to the color of the background of the image behind the letters recognized by the system. If an exact match is not identified for the background color, a color similar to the background color of the original document can be selected. The system stores 212 the font type, font color, background color, location and size in a data structure associated with the word and the determinations of font type, font color, background color, location and size can be repeated for additional words in the document. The system displays 214 the scanned image of the document in the image-based portions of the document and displays the OCR text in the text-based portions of the document. The OCR text is displayed using determined the font type, font color, background color, size and location such that the OCR text appears aesthetically similar to the original text in the scanned document.

While the aesthetic characteristics are described above as being determined on a word-by-word level other levels of granularity can be applied. For example, if the font and colors are similar across a large portion of the document the aesthetic characteristics could be determined and stored on a line-by-line basis. On the other hand, if the coloration or fonts differ, the characteristics could be determined and stored on a letter-by-letter basis.

Figure 7:
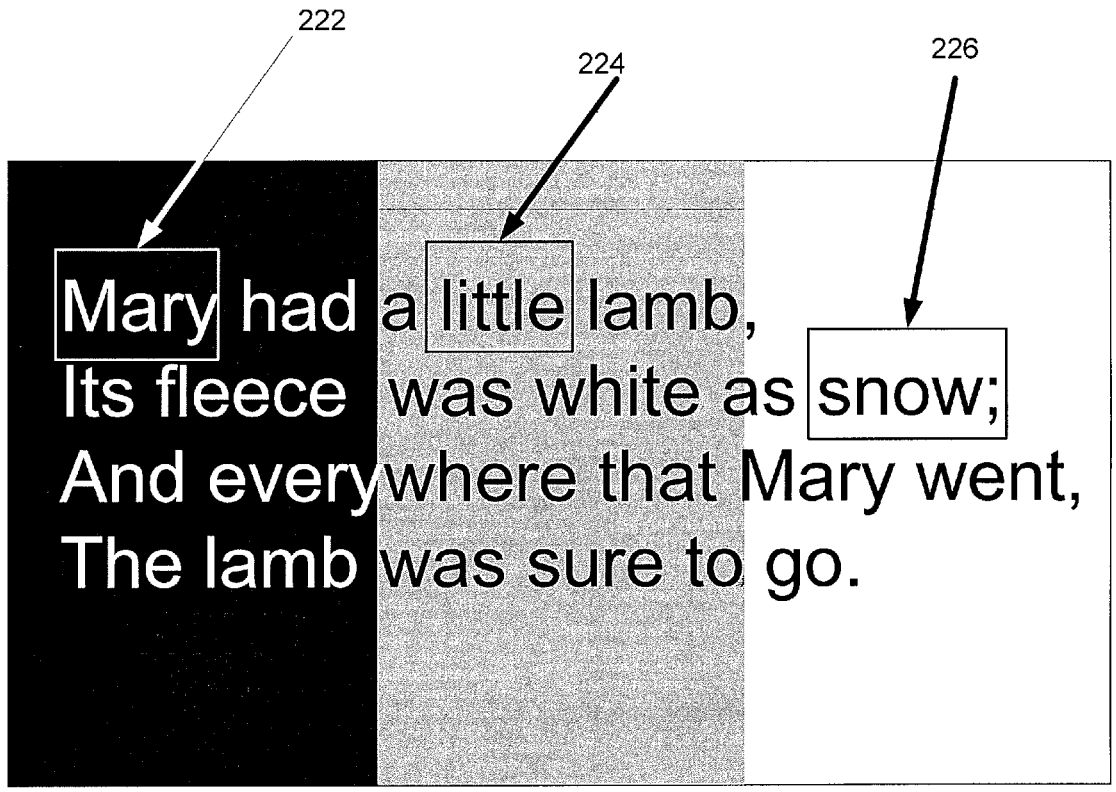
FIG. 7 is a diagram of a text with differing font and background colors.

FIG. 7 shows an exemplary document having variation in both the font color and background color. When the system receives the scanned image of a document, the system recognizes the text using an OCR technique. As described above in relation to FIG. 6, aesthetic characteristics are also determined such that the aesthetic properties of the portions of the original scanned document that are replaced by the OCR text can match the look and feel of the original document.

For example, in FIG. 7, the word Mary (indicated by box 222) is written in Arial type font and the font is white while the background is black. As such, when the system replaces the portion of the scanned image of the document with the OCR text, the OCR text will be presented in white Arial type font with a black background. Similarly, the word little (indicated by box 224) is written in Arial type font and the font is black while the background is grey. As such, when the system replaces the portion 224 of the scanned image of the document with the OCR text, the OCR text will be presented in black Arial type font with a grey background. The word snow (indicated by box 226) is also written in Arial type font and the font is black while the background is white. As such, when the system replaces the portion 226 of the scanned image of the document with the OCR text, the OCR text will be presented in black Arial type font with a white background.

Figure 8A:
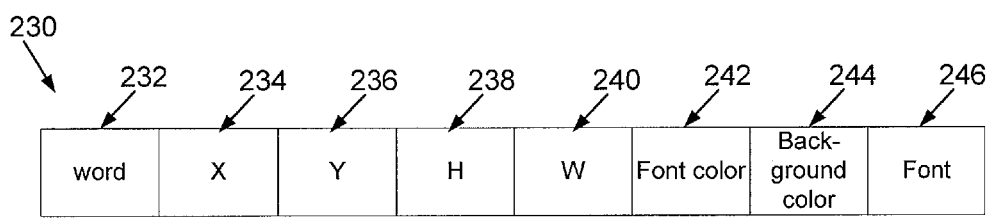
FIG. 8A is a diagrammatical representation of a data structure.
Figure 8B:
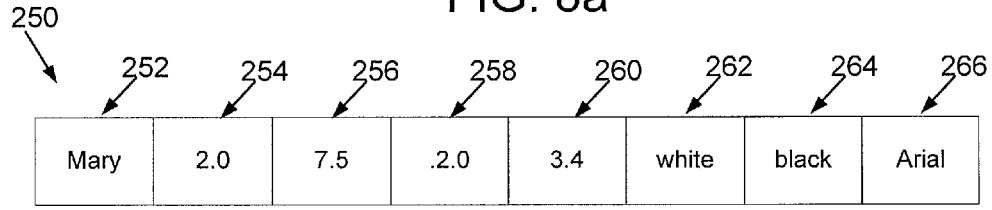
FIG. 8B is a diagrammatical representation of a data structure.

FIG. 8A shows a structure of a data structure 230 for storing information associated with the OCR recognized text. The data structure 230 includes a plurality of fields 232, 234, 236, 238, 240, 242, 244, and 246. For example, the data structure for the word includes a text field 232 which has the OCR generated text and has fields 234 and 236 which provide rectangular coordinate information x and y, respectively, as well as fields 240 and 242 which provide height and width information. The data structure 230 also includes a field 242 that stores information about the color of the font and a field 244 that stores information about the color of the background. The data structure also includes a field 246 that identifies the font type associated with the word. As described above, the information in data structure 230 is used to match the OCR generated text replacement with the look and feel of the original scanned document.

FIG. 8A shows an exemplary data structure with information for the word Mary in FIG. 7 (described above). The data structure 250 includes the OCR recognized text of "Mary" in the text field 252. The data structure would also include positional and size information in the coordinate, height and width information fields 254, 256, 258 and 260. Since the word Mary in FIG. 7 is presented in white Arial font with a black background, the font color field 262 includes an indication of white and the background color filed 264 includes an indication of black. Additionally, the font type field 266 includes an indication that the word Mary should be presented in Arial font.

In some embodiments, the OCR recognized text is overlaid in a semi-transparent fashion, the OCR font is not opaque (as described in examples above where the OCR font replaced or obstructed the scanned image) but rather has a transparency such that both the OCR font and the underlying scanned font can be viewed simultaneously. For example, the font can have a transparency of between about 25% and 75% (e.g., between about 40% and 60%, about 50%).

It is believed that providing the OCR text in a semi-transparent fashion where the underlying image can still be viewed can provide advantages in correcting errors in the OCR text recognition. For example, since both the underlying text and the OCR text can be viewed simultaneously differences between the original text and the OCR text can be readily identified and corrected. After corrections have been made, the semi-transparent font of the OCR text can be changed to an opaque format such that only the OCR text and not the text of the original scanned image is viewed.

Figure 9:
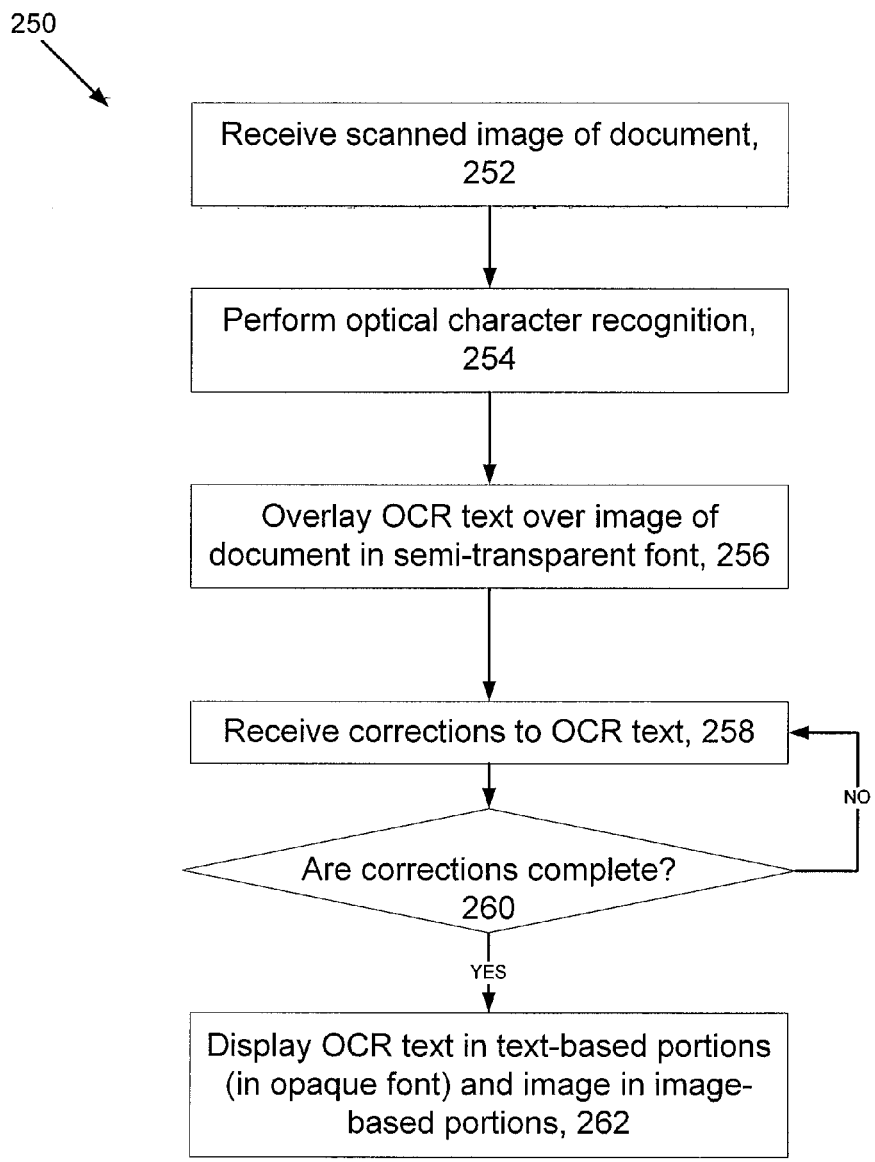
FIG. 9 is a flow chart of a semi-transparent font correction process.

FIG. 9 shows a process 280 for using semi-transparent font in an OCR correction process. The system receives 282 a scanned image of a document and performs 284 optical character recognition on the document to identify and recognize text based portions of the document. The system overlays 286 the OCR generated text over the scanned image of the document in a semi-transparent fashion such that both the original text included in the scanned image of the document and the overlying OCR generated text can be viewed simultaneously. The system receives 258 corrections to the OCR text (e.g., changes to correct recognition errors) and determines 290 of the corrections are complete. If the corrections are not complete, the system returns to receiving corrections. If the corrections are complete, the system displays 292 the OCR text in the text based portions of the scanned document in an opaque format such that the underlying image of the scanned document is no longer visible in those portions and displays the image of the scanned document in the non-text based portions of the document.

In some examples, the methods and systems described above can be used in conjunction with a reading system. Reading machines can improve the educational attainment of individuals with learning disabilities. In general, in a reading machine specialized software processes an input source document and generates synthetic speech to enable a user to hear the computer read through the document a word, line, sentence etc. at a time. Often these reading machines include a scanner to provide one technique to input source documents to the reader. The scanner scans a document and provides an image file representation of the document to the personal computer (e.g., using one or more of the methods described above). The personal computer using optical character recognition software produces an OCR file including generated text information. The OCR file is used by display system software to display a representation of the scanned document on a monitor (e.g., using one or more of the methods described above). The OCR file text is also used by speech synthesis software to synthesize speech. A user can initiate reading of the scanned document at the beginning of the document by selecting a reading mode. Alternatively, the user can have the document start reading from any point in the document by illustratively pointing to the image representation of an item from the scanned document displayed on the monitor.

The systems and methods described herein can be implemented in digital electronic circuitry, or in computer hardware, firmware, software, web-enabled applications, or in combinations thereof. Data structures used to represent information provided by the patient can be stored in memory and in persistence storage. Apparatus of the invention can be implemented in a computer program product tangibly embodied in a machine-readable storage device for execution by a programmable processor and method actions can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired, and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files, such devices include magnetic disks, such as internal hard disks and removable disks magneto-optical disks and optical disks. Storage devices suitable for tangibly embodying computer program instructions and data include all forms of non-volatile memory, including, by way of example, semiconductor memory devices, such as EPROM, EEPROM, and flash memory devices; magnetic disks such as, internal hard disks and removable disks; magneto-optical disks; and CD_ROM disks. Any of the foregoing can be supplemented by, or incorporated in, ASICs (application-specific integrated circuits).

Other implementations are within the scope of the following claims:

What is claimed is:
1. A computer-implemented method, comprising:
 receiving, by a computer, a file that includes a representation of a scanned image of a document;
 determining by the computer one or more portions of the scanned image of the document that are one or more regions of probable text by performing, by the computer, optical character recognition (OCR) on the image file to generate a text file that includes recognized (OCR) text associated with words included in the scanned image of the document;
determining by the computer one or more properties of the words in the scanned image, with the one or more properties including at least a font style and font size;
formatting by the computer the recognized text to match the determined font style and font size of the words in the scanned image; and
displaying the document on a display of a computing device, with one or more portions of the document having words in the scanned image being overlaid with optical character recognized text having the formatted font style and font size, and an transparency between about 25% and 75%, where both the words in the scanned image in the one or more portions of the document and the optical character recognized are viewed simultaneously with differences between words in the scanned image text in the one or more regions of probable text and the overlaid optical character recognized text identified, and with remaining one or more portions of the document displayed from the file that includes the representation of the scanned image of the document.

2. The computer-implemented method of claim 1 further comprises:
providing the optical character recognized text as opaque subsequent to the words being overlaid such that only the optical character recognized text and not the text of the scanned image is viewed; and
overlaying the optical character recognized text as opaque text-based portions to obscure the one or more portions of the scanned image of the document.

3. The computer-implemented method of claim 1, further comprising:
determining a location of a word in the scanned image; and
aligning the OCR text of the word with the determined location in the scanned image in the display of the document.

4. The computer-implemented method of claim 1, further comprising:
determining a color of a word in the scanned image; and
formatting the OCR text of the word to match the determined color of the word.

5. The computer-implemented method of claim 1, further comprising:
determining a color of a background surrounding a word in the scanned image; and
formatting the OCR text of the word to include a background color to match the determined color of the background surrounding the word.

6. The computer-implemented method of claim 1, further comprising:
determining a color of a word in the scanned image;
formatting the OCR text of the word to match the determined color of the word;
determining a color of a background surrounding a word in the scanned image; and
formatting the OCR text of the word to include a background color to match the determined color of the background surrounding the word.

7. The computer-implemented method of claim 1, further comprising:
identifying the text-based portions of the scanned image associated with text on the document;
identifying the image-based portions of the scanned image associated with images on the document.

8. A computer program product tangibly embodied in a computer readable hardware storage device, the computer program product comprising instructions to cause a processor to:
receive a file that includes a representation of a scanned image of a document;
perform optical character recognition (OCR) on the image file to generate a text file that includes recognized (OCR) text associated with words included in the image of the document;
determine one or more properties of the words in the scanned image, with the one or more properties including at least a font style and font size;
format the recognized text to match the determined font style and font size of the words in the scanned image; and
display the document on a display of a computing device with one or more portions of the document having words in the scanned image being overlaid with optical character recognized text having an transparency between about 25% and 75%, where both the words in the scanned image in the one or more portions of the document and the optical character recognized text are viewed simultaneously with differences between words in the scanned image in the one or more regions of probable text and the overlaid optical character recognized text identified, and with remaining one or more portions of the document displayed from the file that includes the representation of the scanned image of the document.

9. The computer program product of claim 8 further comprise instructions to:
provide the optical character recognized text as opaque subsequent to the words being overlaid such that only the optical character recognized text and not the text of the original scanned image is viewed; and
overlay the optical character recognized text as opaque text-based portions to obscure the scanned image of the document.

10. The computer program product of claim 8, further comprising instructions to:
determine a location of a word in the scanned image; and
align the OCR text of the word with the determined location in the scanned image in the display of the document.

11. The computer program product of claim 8, further comprising instructions to:
determine a color of a word in the scanned image; and
format the OCR text of the word to match the determined color of the word.

12. The computer program product of claim 8, further comprising instructions to:
determine a color of a background surrounding a word in the scanned image; and
format the OCR text of the word to include a background color to match the determined color of the background surrounding the word.

13. The computer program product of claim 8, further comprising instructions to:
determine a color of a word in the scanned image;
format the OCR text of the word to match the determined color of the word;
determine a color of a background surrounding a word in the scanned image; and
format the OCR text of the word to include a background color to match the determined color of the background surrounding the word.

14. The computer program product of claim 8, further comprising instructions to:
- identify the text-based portions of the scanned image associated with text on the document;
- identify the image-based portions of the scanned image associated with images on the document.

15. A system, comprising:
- a processor for executing instructions;
- memory coupled to the processor for storing instructions; and
- a computer hardware storage device storing a computer program product, the computer program product comprising instructions to cause the processor to:
- receive a file that includes a representation of a scanned image of a document;
- perform optical character recognition (OCR) on the image file to generate a text file that includes recognized (OCR) text associated with words included in the image of the document;
- determine one or more properties of the words in the scanned image, with the one or more properties including at least a font style and font size;
- format the recognized text to match the determined font style and font size of the words in the scanned image; and
- display the document on a display of a computing device with one or more portions of the document having words in the scanned image being overlaid with optical character recognized text having an transparency between about 25% and 75%, where both the words in the scanned image in the one or more portions of the document and the optical character recognized text are viewed simultaneously with differences between words in the scanned image in the one or more regions of probable text and the overlaid optical character recognized text identified and with remaining one or more portions of the document displayed from the file that includes the representation of the scanned image of the document.

16. The system of claim 15 further configured to:
- provide the optical character recognized text as opaque subsequent to the words being overlaid such that only the optical character recognized text and not the text of the original scanned image is viewed;
- overlay the optical character recognized text as opaque text-based portions to obscure the scanned image of the document.

17. The system of claim 15, wherein the instructions to display are further configured to:
- determine a location of a word in the scanned image; and
- align the OCR text of the word with the determined location in the scanned image in the display of the document.

18. The system of claim 15, wherein the instructions to display are further configured to:
- determine a color of a word in the scanned image; and
- format the OCR text of the word to match the determined color of the word.

19. The system of claim 15, further comprising instructions to:
- determine a color of a background surrounding a word in the scanned image; and
- format the OCR text of the word to include a background color to match the determined color of the background surrounding the word.

20. The system of claim 15, wherein the instructions to display are further configured to:
- determine a color of a word in the scanned image;
- format the OCR text of the word to match the determined color of the word;
- determine a color of a background surrounding a word in the scanned image; and
- format the OCR text of the word to include a background color to match the determined color of the background surrounding the word.

21. The system of claim 15, wherein the instructions to display are further configured to:
- identify the text-based portions of the scanned image associated with text on the document; and
- identify the image-based portions of the scanned image associated with images on the document.

* * * * *